United States Patent
Monasor et al.

(10) Patent No.: US 11,263,589 B2
(45) Date of Patent: Mar. 1, 2022

(54) GENERATION OF AUTOMATED JOB INTERVIEW QUESTIONNAIRES ADAPTED TO CANDIDATE EXPERIENCE

(71) Applicant: International Business Machines Corporation, Armonk, NY (US)

(72) Inventors: Miguel J. Monasor, Dublin (IE); Moisés Domínguez García, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 15/841,970

(22) Filed: Dec. 14, 2017

(65) Prior Publication Data
US 2019/0188645 A1 Jun. 20, 2019

(51) Int. Cl.
*G06Q 10/10* (2012.01)
*G06Q 10/06* (2012.01)
*G06F 16/00* (2019.01)
*G06F 40/10* (2020.01)
*G06F 40/279* (2020.01)

(52) U.S. Cl.
CPC ......... *G06Q 10/1053* (2013.01); *G06F 16/00* (2019.01); *G06F 40/10* (2020.01); *G06F 40/279* (2020.01); *G06Q 10/063112* (2013.01)

(58) Field of Classification Search
CPC ................................................ G06Q 10/1053
See application file for complete search history.

(56) References Cited

U.S. PATENT DOCUMENTS

| 6,873,934 | B1 | 3/2005 | Rodrigues et al. |
| 6,959,417 | B2 | 10/2005 | Gupta |
| 7,496,518 | B1 | 2/2009 | Cayton et al. |
| 2002/0143573 | A1 | 10/2002 | Bryce et al. |
| 2005/0033633 | A1* | 2/2005 | LaPasta ............ G06Q 10/1053 434/362 |
| 2005/0080656 | A1* | 4/2005 | Crow ..................... G06Q 10/10 705/7.14 |

(Continued)

FOREIGN PATENT DOCUMENTS

| CN | 103577507 | 2/2014 |
| WO | 200146891 | 6/2001 |

OTHER PUBLICATIONS

Hughes, Melba "Looking Beyond The Resume: How To Assess Intangible Skills When Evaluating Candidates" Major, Lindsey & Africa, Feb. 3, 2016; available at: https://www.mlaglobal.com/en/knowledge-library/articles/how-to-assess-intangible-skills-when-evaluating-candidates-resumes (Year: 2016).*

(Continued)

*Primary Examiner* — Andrew B Whitaker
*Assistant Examiner* — Brendan S O'Shea
(74) *Attorney, Agent, or Firm* — Edell, Shapiro & Finnan, LLC

(57) ABSTRACT

According to embodiments of the present invention, a system is provided that will evaluate a candidate's experience (e.g., curriculum vitae (CV), resume, application, etc.) in view of job description requirements, and based on this combined information, will automatically generate a customized interview including questions tailored to each candidate related to his or her experience as described on the application and in view of the job description requirements.

14 Claims, 10 Drawing Sheets

(56) References Cited

U.S. PATENT DOCUMENTS

| | | |
|---|---|---|
| 2005/0197988 A1 | 9/2005 | Bublitz |
| 2006/0080128 A1* | 4/2006 | Brown ................... G06Q 10/00 705/321 |
| 2006/0177808 A1* | 8/2006 | Aosawa .................. G06F 40/30 434/322 |
| 2008/0172284 A1* | 7/2008 | Hartmann ...... G06Q 10/063112 705/7.14 |
| 2012/0089546 A1 | 4/2012 | Ahmed |
| 2014/0207415 A1 | 7/2014 | Bhutani et al. |
| 2014/0236852 A1 | 8/2014 | Emmerton |
| 2014/0278378 A1* | 9/2014 | Mellett ............... G06F 17/2785 704/9 |
| 2015/0127567 A1* | 5/2015 | Menon ............... G06Q 10/1053 705/321 |
| 2016/0140504 A1 | 5/2016 | Obeid |
| 2016/0203432 A1 | 7/2016 | Shaw et al. |
| 2016/0283905 A1 | 9/2016 | Lahti et al. |
| 2016/0364692 A1* | 12/2016 | Bhaskaran ......... G06Q 10/1053 |
| 2017/0161686 A1* | 6/2017 | Dyrvig .............. G06F 16/24578 |
| 2018/0122256 A1* | 5/2018 | Smith ...................... G09B 7/00 |
| 2018/0336528 A1* | 11/2018 | Carpenter .......... G06Q 10/1053 |
| 2019/0114593 A1* | 4/2019 | Champaneria ...... G06F 16/3325 |

OTHER PUBLICATIONS

"When" Definitions, Merriam-Webster as archived Aug. 18, 2017; available at: https://web.archive.org/web/20170818155018/https://www.merriam-webster.com/dictionary/when (Year: 2017).*

Heilman, Michael, and Noah A. Smith. "Good question! statistical ranking for question generation."Human Language Technologies: The 2010 Annual Conference of the North American Chapter of the Association for Computational Linguistics. Association for Computational Linguistics, 2010. (Year: 2010).*

Buckley, Patrick, et al. "The use of an automated employment recruiting and screening system for temporary professional employees: A case study." Human Resource Management: Published in Cooperation with the School of Business Administration 43.2-3 (2004): 233-241 (Year: 2004).*

Anonymous, Curriculum Vitae Analysis, DaXtra, http://www.daxtra.com/2014/03/03/curriculum-vitae-analysis/, Mar. 3, 2014, 5 pages.

Lundqvist et al., An Ontological Approach to Competency Management, Proceedings of iLearn 2007, Jan. 29-31, 2007, Paris, 6 pages.

Hassan et al., Automatic Document Topic Identification Using Wikipedia Hierarchical Ontology, The 11th International Conference on Information Sciences, Signal Processing and their Applications: Main Tracks, 2012, pp. 237-242.

Araki et al., Generating Questions and Multiple-Choice Answers using Semantic Analysis of Texts, Proceedings of COLING 2016, the 26th International Conference on Computational Linguistics: Technical Papers, Osaka, Japan, Dec. 2016, pp. 1125-1136.

Kao et al., Semantics-based Question Generation and Implementation, Dialogue and Discourse, Special Issue on Ouestion Generation, 3(2):11-42, (2012).

Fong et al., Intelligent Question Bank and Examination System, Proceedings of the 5th WSEAS International Conference on E-ACTIVITIES, Venice, Italy, Nov. 20-22, 2006, pp. 142-147.

Anonymous, Watson Natural Language Understanding, https://www.ibm.com/watson/developercloud/natural-language-understanding.html, 2017, 6 pages.

Harzallah et al., CommOnCV: Modelling the Competencies Underlying a Curriculum Vitae, Proceedings of the 14th International Conference on Software Engineering and Knowledge Engineering, Jul. 15-19, 2002, pp. 65-71.

Miranda et al., An Ontology-Based Model for Competence Management, Data & Knowledge Engineering, vol. 107, Jan. 2017, pp. 51-54.

Wolfe, Automatic Question Generation from Text—An Aid to Independent Study, Proceedings of the ACM SIGCSE-SIGCUE Technical Symposium on Computer Science and Education, Feb. 1, 1976, pp. 104-112.

Teo et al., Designing GA-based Auto-Generator of Examination Questions, Proceedings of the 2012 Sixth UKSim/AMSS European Symposium on Computer Modeling and Simulation (EMS '12), Nov. 2012, pp. 60-64.

Xiaoqin, Research and Design of Intelligent Generating Test Paper System, Proceeding of the International Conference on Computational Intelligence and Software Engineering, IEEE, 2009, 4 pages.

Chalidabhongse et al., Facilitating Job Recruitment Process Through Job Application Support System, 2006 IEEE International Conference on Management of Innovation and Technology, Jun. 21-23, 2006, Singapore, China, pp. 111-115.

Cheng et al., Novel Approach of Auto-generating Examination Papers, Based on Fuzzy Logic, Proceeding of 2010 International Conference on e-Education, e-Business, e-Management, and e-Learning, Jan. 2010, pp. 411-414.

* cited by examiner

| REQUIRED COMPETENCIES | CANDIDATE COMPETENCIES | | | | | |
|---|---|---|---|---|---|---|
| | JAVA (MEDIUM) | SQL (HIGH) | AVAILABILITY TO TRAVEL (LOW) | SPANISH (HIGH) | .NET (HIGH) | FRENCH (LOW) |
| CLOUDANT (HIGH) | UNRELATED | RELATED | UNRELATED | UNRELATED | CORRELATIVE | UNRELATED |
| JAVA (HIGH) | MATCH | CORRELATIVE | UNRELATED | UNRELATED | RELATED | UNRELATED |
| NODEJS (LOW) | RELATED | CORRELATIVE | UNRELATED | UNRELATED | RELATED | UNRELATED |
| FRENCH (MEDIUM) | UNRELATED | UNRELATED | CORRELATIVE | RELATED | UNRELATED | MATCH |
| SPANISH (HIGH) | UNRELATED | UNRELATED | CORRELATIVE | MATCH | UNRELATED | RELATED |
| PROBLEM SOLVING SKILLS (HIGH) | CORRELATIVE | CORRELATIVE | UNRELATED | UNRELATED | CORRELATIVE | UNRELATED |

FIG.3

GENERATION OF AUTOMATED JOB INTERVIEW QUESTIONNAIRES ADAPTED TO CANDIDATE EXPERIENCE

BACKGROUND

1. Technical Field

Present invention embodiments relate to generating automated job interview questionnaires, and in particular, to utilizing systems to adapt interview questions to a particular candidate based on their experience.

2. Discussion of the Related Art

Interviewing candidates for a job position is a costly and time consuming process for companies, especially when a large number of candidates apply for a limited number of positions or when a company seeks to interview a large number of candidates to fill a small number of positions. To help manage this process, companies often hire external recruiters to assist with the initial stages of the hiring process. Recruiters typically interview candidates by asking each candidate questions that are common to all candidates as well as by asking specific questions tailored to a candidate's particular experience. Generating such interview questions requires both technical knowledge of the position being offered as well as an understanding of the candidate's experience based on his or her resume or curriculum vitae and is usually performed manually.

While existing platforms may allow the generation of assessments, surveys or interviews through an interface that provides functionality for defining and delivering questionnaires to an end user (e.g., a job candidate or interviewer), utilizing such platforms are costly, difficult to use, and require expertise to generate appropriate questions. Other platforms provide a set of predefined questions grouped by topic(s) that can be used to generate surveys. However, these platforms typically rely upon an experienced administrator to manually modify existing predefined interview templates and may also be costly.

SUMMARY

According to embodiments of the present invention, systems, methods and computer readable media are provided for automating the generation of customized interview questionnaires. A first document is parsed to identify a set of candidate competencies of an entity, and a second document is parsed to identify a set of required competencies for an activity. A relationship is determined between each required competency and each candidate competency. An interview structure is established based on the relationships between each required competency and each candidate competency to determine categories of questions to include in a customized interview questionnaire. The customized interview questionnaire is generated by obtaining questions corresponding to the categories of questions according to the interview structure.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. Through the more detailed description of some embodiments of the present disclosure in the accompanying drawings, the above and other objects, features and advantages of the present disclosure will become more apparent.

FIG. 3 is a table showing competency pairs of candidate competencies in view of required competencies, in accordance with embodiments of the present disclosure.

DETAILED DESCRIPTION

According to an embodiment of the present invention, a system is provided that will evaluate a candidate's experience (e.g., curriculum vitae (CV), resume, application, etc.) in view of job description requirements, and based on this combined information, will automatically generate a customized interview questionnaire customized to a candidate based on his or her experience, as described in the job application and in view of the job description requirements. In general, questions may be: (1) generated based on historical questions and answers, and/or (2) automatically generated based on external sources.

In some embodiments, the customized interview questionnaire is generated prior to the interview. In other embodiments, the customized interview questionnaire is generated (dynamically) during the interview, using a system that selects subsequent questions based upon a response from a candidate to a current question. In still other embodiments, the customized interview questionnaire can be used as a script, generated before or during an interview, for a human interviewer.

In some aspects, automatic generation of a customized interview questionnaire may utilize an abstract interview schema with branching in order to consider potential questions as well as a candidate's possible answers to the potential questions. In some aspects, automatic generation of the customized interview questionnaire can include questions that combine multiple aspects of a job description. Generating high quality interview questions according to the techniques provided herein allow for the best candidate to be selected and identified for the job position, in an automated or semi-automated, intelligent manner.

Figure 1:
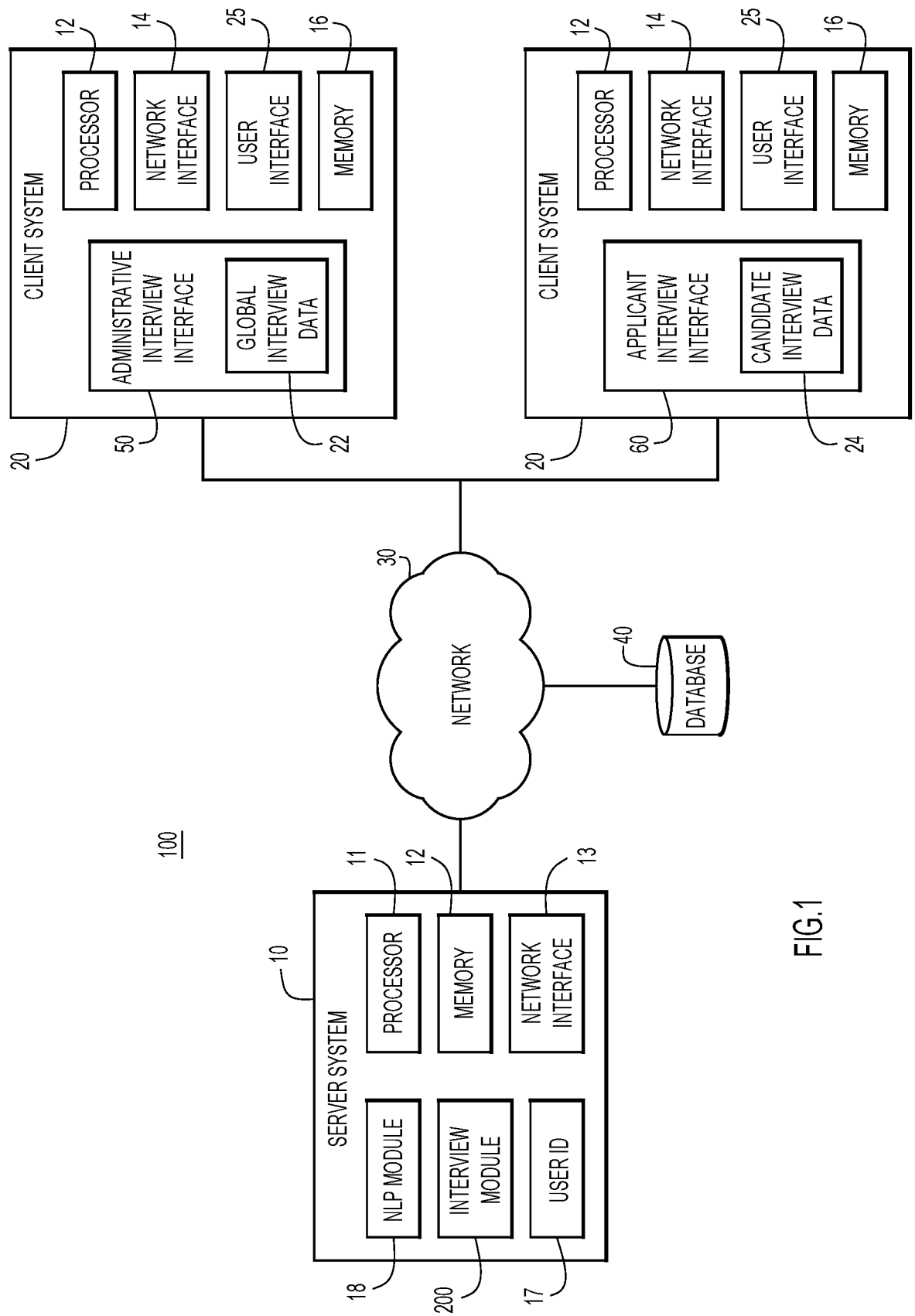
FIG. 1 is a block diagram of an example computing environment for generating customized interview questionnaires in accordance with embodiments of the present disclosure.

An example computing environment for use with present invention embodiments is illustrated in FIG. 1. Specifically, the environment 100 includes one or more server systems 10, and one or more client or end-user systems 20. For example, client system 20 may include an administrative interview interface 50, through which an administrator (e.g., an interviewer) may access customized interview questionnaires before or during the interview. The administrative interview interface 50 may display global interview data 22 (e.g., candidate rankings, customized interview questionnaires, analyzed competencies, etc.) to an administrator. In other aspects, client system 20 may include an applicant interview interface 60, through which an applicant (e.g., an interviewee) may access customized interview questionnaires before or during the interview. The applicant interview interface 60 may display candidate interview data 24 (e.g., customized interview questionnaires, etc.) to an applicant. One or both client systems may be utilized during the interview. Server systems 10 and client systems 20 may be remote from each other and may communicate over a network 30. The network may be implemented by any number of any suitable communications media (e.g., wide area network (WAN), local area network (LAN), Internet, Intranet, etc.). Alternatively, server systems 10 and client systems 20 may be local to each other, and may communicate via any appropriate local communication medium (e.g., local area network (LAN), hardwire, wireless link, Intranet, etc.).

Client systems 20 enable users or administrators to submit documents (e.g., documents pertaining to a job application, documents pertaining to a job description, etc.) and other inputs (e.g., a number (N) of questions) and provide responses to the customized interview questionnaire to server systems 10. Server systems 10 may generate customized interview questionnaires by selecting questions to ascertain a candidate's experience in view of a plurality of required competencies (e.g., required skills for the job). Server systems 10 may include an interview module 200 to generate customized interview questionnaires, parse documents, and analyze competency pairs. The interview module 200 may also select the next interview question based on a response to a current interview question. A database system 40 may be used to store various information for the analysis (e.g., interview questions, candidate job applications, competency pairs and weights, job descriptions, candidate responses to questions, etc.). For example, database 40 may store and provide access to: (1) historical interview questions and corresponding corpuses of knowledge; (2) current interview questions, candidate rankings for an interview, competencies, etc. The database system may be implemented by any conventional or other database or storage unit, may be local to or remote from server systems 10 and client systems 20, and may communicate via any appropriate communication medium (e.g., local area network (LAN), wide area network (WAN), Internet, hardwire, wireless link, Intranet, etc.). The client systems may present a graphical user (e.g., GUI, etc.) or other user interface 25 (e.g., command line prompts, menu screens, etc.) to solicit information from users pertaining to the desired documents and analysis, and may provide reports including analysis results (e.g., interview questions, competency pairs, rankings of top candidates for interviews, customized interview questionnaires, interview schema with branching, etc.).

Server systems 10 may be implemented by any conventional or other computer systems preferably equipped with a display or monitor, a base (e.g., including for the server system 10, at least one processor 11, one or more memories 12 and/or internal or external network interfaces or communications devices 13 (e.g., modem, network cards, etc.)), optional input devices (e.g., a keyboard, mouse or other input device), and any commercially available and custom software (e.g., server/communications software, interview module 200, NLP module 18, etc.). Client systems 20 may be implemented by any conventional or other computer systems preferably equipped with a display or monitor, a base (e.g., including for the client system 20, at least one processor 12, one or more memories 16 and/or internal or external network interfaces or communications devices 14 (e.g., modem, network cards, etc.)), optional input devices (e.g., a keyboard, mouse or other input device), and any commercially available and custom software (e.g., client/communications software, administrative interview interface 50 and applicant interview interface 60, browser software, etc.).

Alternatively, one or more client systems 20 may analyze documents (e.g., a job application, resume, or CV) to generate customized interview questions and analyze competencies pertaining to a job description when operating as a stand-alone unit. In a stand-alone mode of operation, the client system stores or has access to the data (e.g., job descriptions, job applications, repository of previously generated interview questions, interview schema with branching, etc.), and includes an interview module to analyze a candidate's application in view of a job description to generate a customized interview questionnaire. In some embodiments, the graphical user (e.g., GUI, etc.) or other interface (e.g., command line prompts, menu screens, etc.) may solicit answers to the customized interview questionnaire and may provide reports (e.g., interview questions, competency pairs, rankings of top candidates for interviews, customized interview questionnaires, interview schema with branching, etc.).

The interview module 200 may include one or more modules or units to perform the various functions of present invention embodiments described herein. The various modules include natural language processor (NLP) 18, User ID 17, etc., and may be implemented by any combination of any quantity of software and/or hardware modules or units, and may reside within memory 12 or 16 of the server and/or client systems for execution by processor 11 or 12. User ID 17 may be used to associate a particular applicant with a customized interview questionnaire and associated data and ranking.

In some aspects, NLP 18 may be utilized to determine the meaning of competencies. For example, the NLP may evaluate the context of a candidate competency (e.g., knowledge of SQL), to ascertain whether the user has a high level of experience, a moderate level of experience, or a low level of experience. For example, a user with a high level of experience may have phrases in the job application, such as "team lead" or "project manager" within the context of SQL-based activities. Alternatively, NLP 18 may evaluate the context of a required competency (e.g., knowledge of SQL) from a job description to ascertain whether the description seeks an applicant with a high level of experience, a moderate level of experience, or a low level of experience. A job description listing "entry-level" would indicate a low level of experience. As yet another example, if a required competency indicates "strong leadership skills" and the "ability to multitask", NLP 18 may analyze the job application and infer whether or not (and to what degree) the applicant possesses each of these skills. Thus, NLP 18 may perform semantic analysis, determining the context around words and phrases, to infer meaning (e.g., levels of experience, etc.) regarding candidate competencies and required competencies.

Advantages of present invention embodiments include generation of new interview questions that were not considered in the existing knowledge base or database, time savings with regard to generating interview questionnaires, improving customization of interviews tailored to assess a candidate's competencies, and avoiding or minimizing intervention of human experts to reduce costs associated with filling a job position.

Additional advantages include customizing interviews to a particular candidate considering their experience in terms of specific skills or competencies, level of skill, and breadth of knowledge, as well as generating higher quality interviews (based on both historical interview questions and a candidate's competencies analysis) to identify the strongest candidates, which may be missed using traditional methods of interviewing.

Further, the interview module 200 may continuously generate improved questionnaires (e.g., by generating new questions pertaining to new competencies, by improving determination of a level of experience, etc.), as more data becomes available, which can be used in the future.

Figure 2:
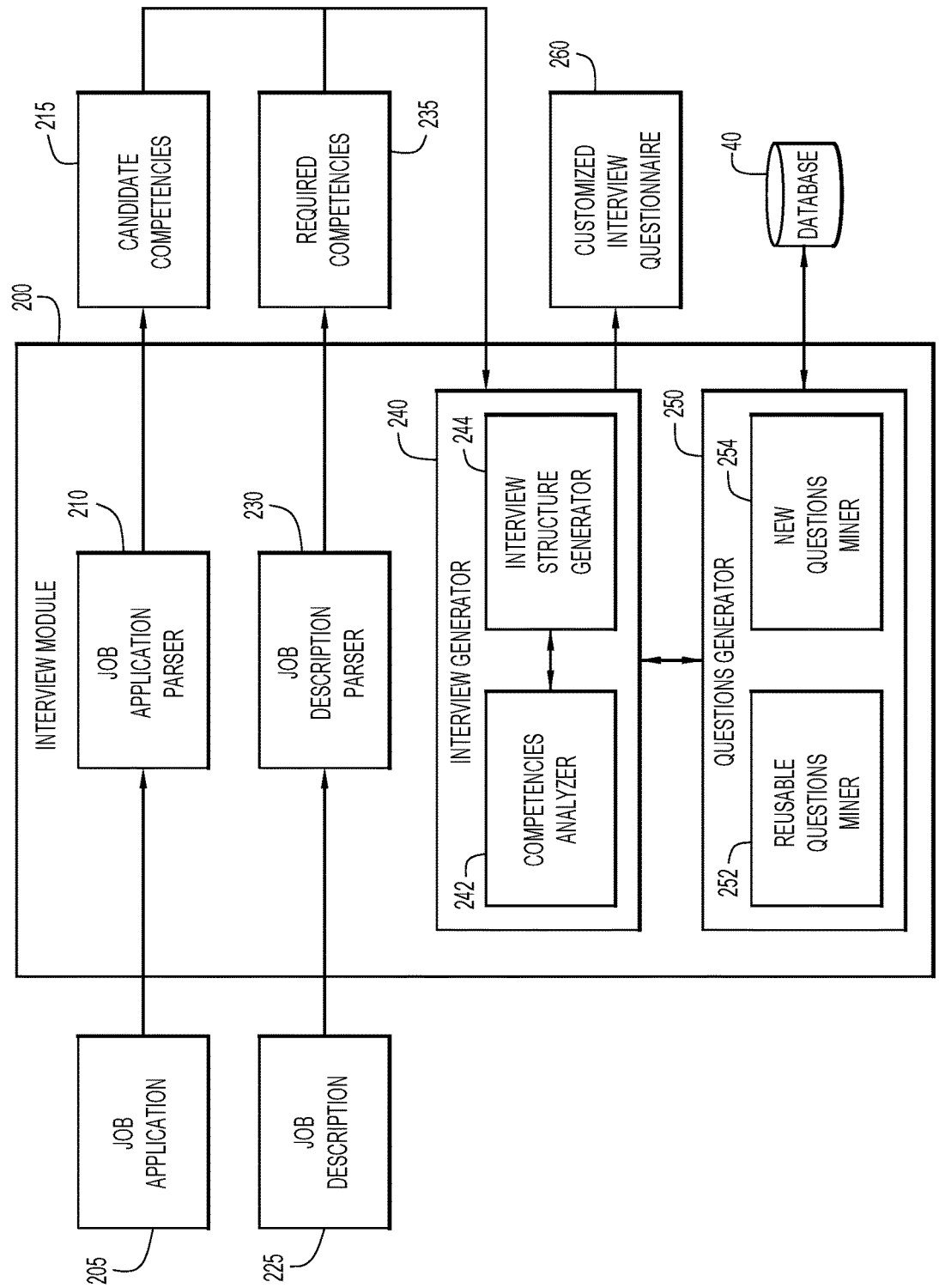
FIG. 2 is a block diagram of an interview module for generating customized interview questionnaires, in accordance with embodiments of the present disclosure.

FIG. 2 shows an example architecture of the interview module 200. Inputs of the interview module 200 include a candidate's job application 205 (e.g., a resume, a curriculum vitae, etc.), the job description 225, and a number (N) of desired interview questions (not shown). Outputs of the interview module 200 may include a customized interview questionnaire 260 (e.g., a structured script comprising the customized interview questionnaire, an interactive online application comprising the customized interview questionnaire, etc.), which may include branches to subsequent questions based on a candidate's answer to a current question.

The interview module 200 comprises a number of modules including a job application module 205, a job application parser 210, candidate competencies 215, job description module 225, job description parser 230, required competencies 235, an interview generator 240, a questions generator 250, and an output interview questionnaire 260. Interview generator 240 may additionally comprise competencies analyzer 242 and interview structure generator 244. Questions generator 250 may additionally comprise reusable questions miner 252 and new questions miner 254. Each of these modules is described in additional detail as follows.

Job application parser 210 parses a job application 205 (e.g., a candidate's CV, resume, etc.) in structured or free text format or a combination thereof. The job application 205 may be parsed to identify and extract a list of candidate competencies (e.g., technical skills, non-technical skills, capabilities, level of experience, accomplishments, etc.) of an entity (e.g., an individual seeking a job, an organization seeking to be hired to perform services, etc.). Job application parser 210 may also include for each competency, a reason as to why the competency is listed.

In order to extract competencies from an unstructured job application 205, any suitable technique for data extraction (e.g., a DaXtra Parser, Watson Natural Language Understanding, natural language processing (NLP) module 16, etc.) may be utilized in order to categorize the information presented in the job application 205 into a competency.

In some embodiments, competencies along with a corresponding level of experience may be determined. For example, the level of experience with regard to a competency may be deduced or estimated from the job application 205 based on: (1) a frequency in which the candidate mentions the competency in the job application, (2) an amount of time (experience) in which the candidate has spent developing a competency (e.g., years of employment at a position utilizing the competency), and/or (3) characterizing an importance of the competency in the job application based on how the competency is presented in the job application (e.g., by considering parameters such as the position title relating to the competency within the CV, formatting of the competency, job responsibilities relating to the competency, etc.). As an example, if availability to travel is a competency, then this competency may be deduced by considering information in the job application, e.g., the location of previous jobs, references to traveling as part of previous jobs, etc. For example, the competency may be listed as:

{"Competency": "Availability to travel",
    "level": "Medium",
"reason": "candidate worked in two different cities in last 10 months"
    }

In cases in which the job application is structured, the competencies and levels may be explicitly mentioned and directly extracted, rather than inferred.

Thus, the input to job application parser 210 is a job application, and an output is a formatted data structure (e.g., candidate competencies 215) including each extracted competency (e.g., skill or feature of the candidate), a corresponding level of experience (as applicable), and a reason as to why the competency is listed (as applicable).

Job description parser 230 parses a job description 225 that may be either structured or unstructured (described in free text format). The description may be analyzed to retrieve a list of required competencies 235 for the job position and the level of experience that is required for a respective competency (when specified). Required competencies may include activities associated with successful performance of a job.

Job description parser 230 parses a job description 225 in structured or free text format. The job description 225 may be analyzed to identify and extract a list of required competencies (e.g., desired technical skills, desired non-technical skills, capabilities, required level of experience, accomplishments, etc.). Job description parser 230 may also include, for each competency, a reason as to why the competency is listed.

In order to extract competencies from an unstructured job description 225, any suitable technique for data extraction (e.g., a DaXtra Parser, Watson Natural Language Understanding, natural language processing (NLP) module 16, etc.) may be utilized in order to categorize the information presented in the job description 225 as a competency.

In some embodiments, required competencies 235 along with corresponding levels of experience may be determined. For example, the level of experience may be deduced or estimated from the job description 225 based on (1) a frequency in which the job description mentions the competency, (2) an amount of time (years of experience) specified by the job description for a competency, and/or (3) characterizing an importance of the required competency in the job description based on how the competency is presented in the job description (e.g., by considering parameters such as the position of the required competency within the job description, formatting of the competency, words indicating importance such as "must have" or "will have", etc.).

In cases in which the job description is structured, the competencies and levels of experience may be explicitly mentioned and directly extracted, rather than inferred.

Thus, the input to job description parser 230 is a job description, and an output is a formatted data structure (e.g., required competencies 235) including each extracted required competency, a corresponding level of experience (as applicable), and a reason as to why the competency is needed (as applicable).

Candidate competencies 215 and required competencies 235 are provided to interview generator 240, which is responsible for determining an overall structure of the customized interview questionnaire as well as interfacing with questions generator 250 to obtain questions. Interview generator 240 comprise competencies analyzer 242 and interview structure generator 244.

Competencies analyzer 242 may be used to match a list of required competencies 235 from a job description 225 with a candidate's competencies 215 based on their job application 205. As an example, competencies analyzer 242 may rate how well a candidate's competencies match the description competencies as depicted in the table shown in FIG. 3. In some embodiments, a match competency, a related competency, a correlative competency, and an unrelated competency may be assigned to each competency pair (a required competency, a candidate competency) and associated with different weighting factors (e.g., high, low medium). In some embodiments, candidates may be ranked by aggregating competency pairs (a required competency, a candidate competency) multiplied by respective weighting factors. For example, each competency pair may be weighted and summed to determine a numeric metric in which to identify top candidates based on a ranking for an interview.

In FIG. 3, each pair of competencies (job description competency, candidate competency) is classified according to the following categories: match (indicates same class), related competency (indicates related class), correlative (indicates a different competency at a specified level of a predefined ontology, derived from another class), and unrelated (indicates completely different class). When a required competency in the job description does not match the candidate's competencies extracted from the application, and is not related or correlative, the competency pair may be designated as unrelated. When a required competency in the job description matches the candidate's competencies extracted from the application, the competency pair may be designated as a match.

Figure 4:
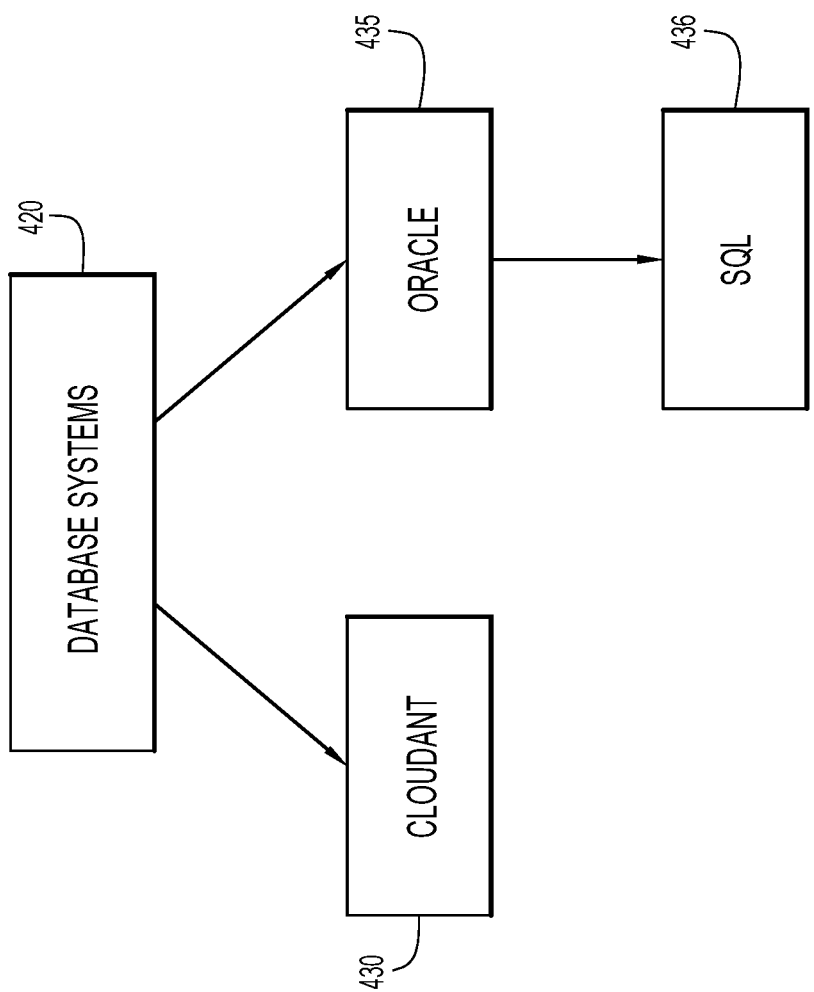
FIG. 4 is an example hierarchy showing related competencies according to embodiments of the present disclosure.

When a required competency is not found in a set of candidate competencies, the competencies analyzer 242 may determine whether a related competency, associated with a similar skill set, is found. For example, and with reference to FIG. 4, if a job position has a Cloudant competency requirement and the candidate's competencies did not include this feature, but the candidate's competencies include experience with SQL (a related competency, as SQL is used to manage a type of database system), then this relationship may be designated as a "related competency". As shown in FIG. 4, both Cloudant 430 and Oracle 435 are types of database systems 420, with SQL 436 being a programming language for Oracle databases 435. Accordingly, an interviewer may be prompted by the customized interview questionnaire to include questions involving knowledge of SQL.

When a match competency and a related competency is not found, the competencies analyzer 242 may look for competencies that can be correlative, and an interview may be prompted by the customized interview questionnaire to include questions involving correlative knowledge, to help determine candidate's competency and ability for the job position.

Figure 5:
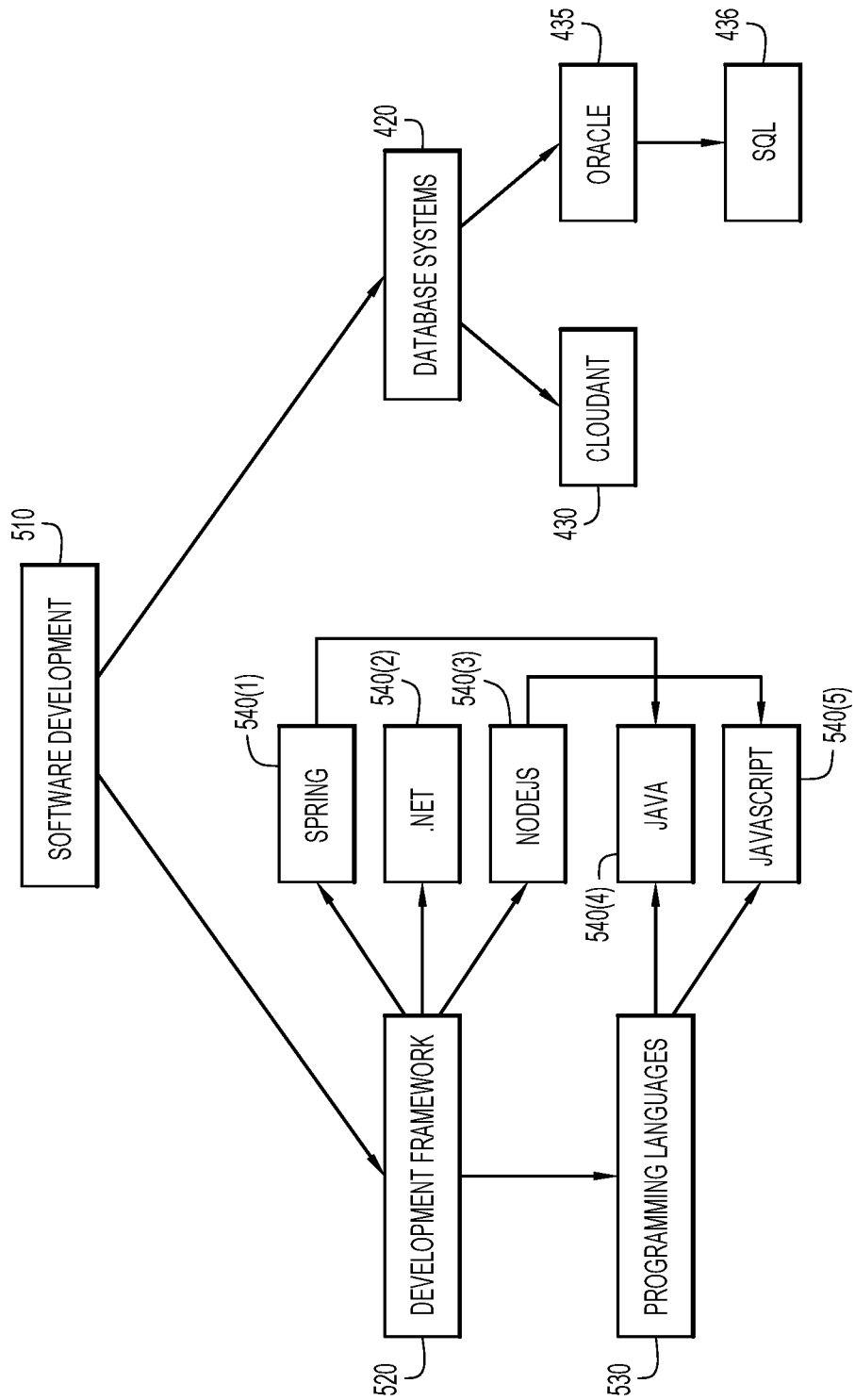
FIG. 5 is another example hierarchy showing correlative competencies according to embodiments of the present disclosure.

For example, FIG. 5 shows an example ontology, with both related competencies (see FIG. 4) and correlative competencies. Classes (shown here as software development 510, development framework 520, programming languages 530, and database systems 420, etc.) may be analyzed up to a predefined level of the ontology hierarchy. In general, each competency from the candidate's competencies 215 and the job offer, is classified according to a predefined ontology-based model for the representation of competencies.

Ontologies may be used to determine the relationship between candidate competencies and required competencies: a match may be from the same class; related may be from the same origin class; correlative may be based on analysis of higher level classes up to a predefined level; or unrelated with no related classes up to a predefined level of the ontology.

Related competencies may have the same class origin. For example, the class "database systems" 420, includes both Oracle 435 and Cloudant 430, and therefore, are related.

In other aspects, if the required competency is knowledge of JAVA and the candidate also knows SQL, the interview module may generate questions about data manipulation in JAVA. In some embodiments, the interview module may generate interview questions covering multiple competencies for the customized interview questionnaire, based upon the ontology, e.g., based on related or correlative competencies as defined by the ontology.

The ontology shown in FIG. 5 also shows correlative competencies. For example, Java (a programming language 520) and Cloudant (a database system) are correlative competencies. In this case, Java 540(4) is a descendant of Development Framework (520) and Cloudant is a descendant of Database systems (420), which are at the same level, which matches the predefined value defined for determining correlative competencies. Both "Development Framework" 520 and "Database System" 420, fall under the scope of "Software Development" 510. Descendants of development framework are shown as 540(1) to 540(5).

Additionally, match competencies may have the same class, while unrelated competencies do not have related or correlative classes up to a predefined level of the ontology.

Thus, the competency analyzer 242 of FIG. 2 accepts as input a set of required competencies 235 (pertaining to the job description) and a set of candidate competencies 215, and generates as a set of outputs, a table or listing indicating how each required competency aligns with a candidate's competencies.

Figure 6A:
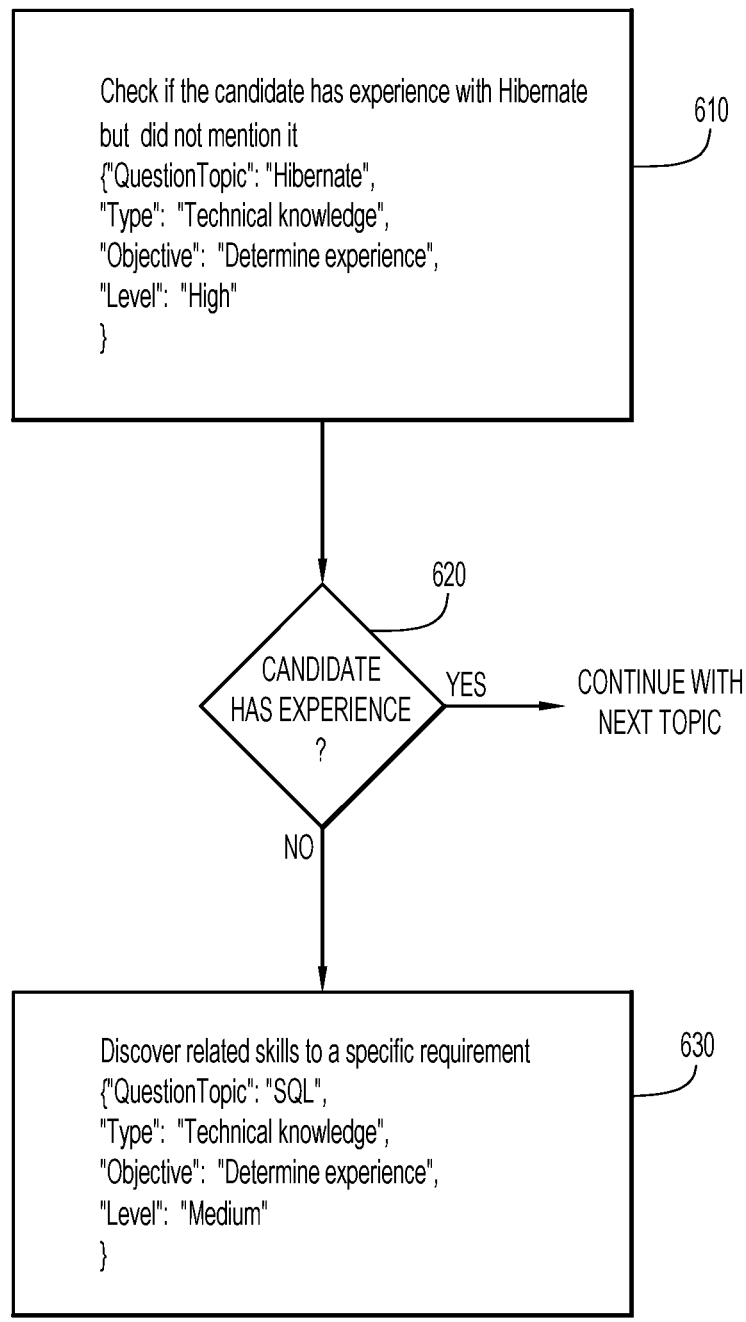
FIGS. 6A-C are flowcharts of operations corresponding to generating a customized interview questionnaire according to embodiments of the present disclosure.
Figure 6B:
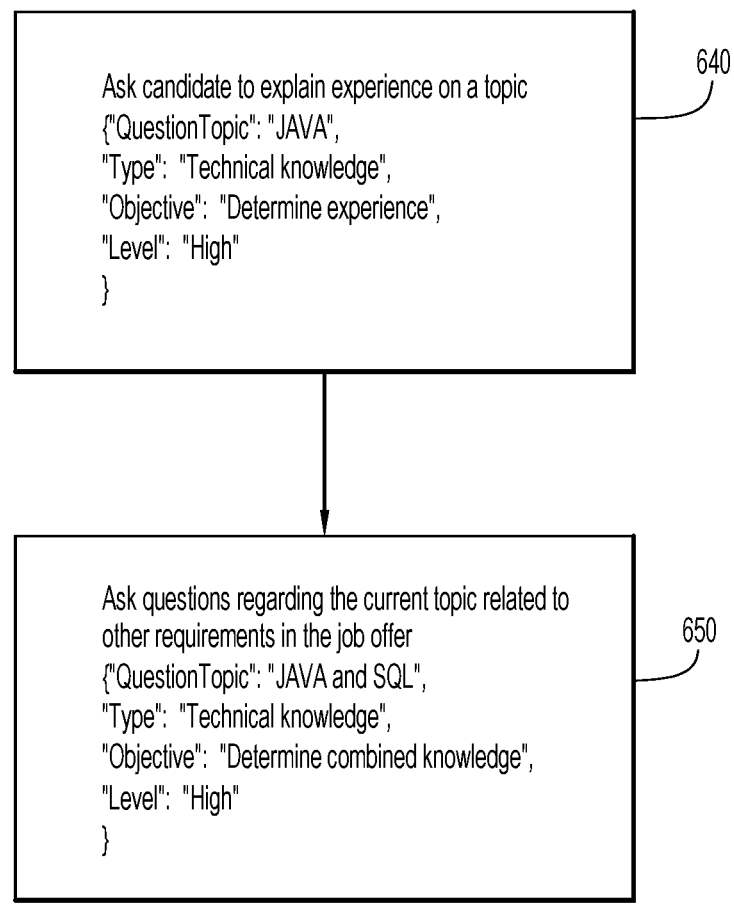
Figure 6C:
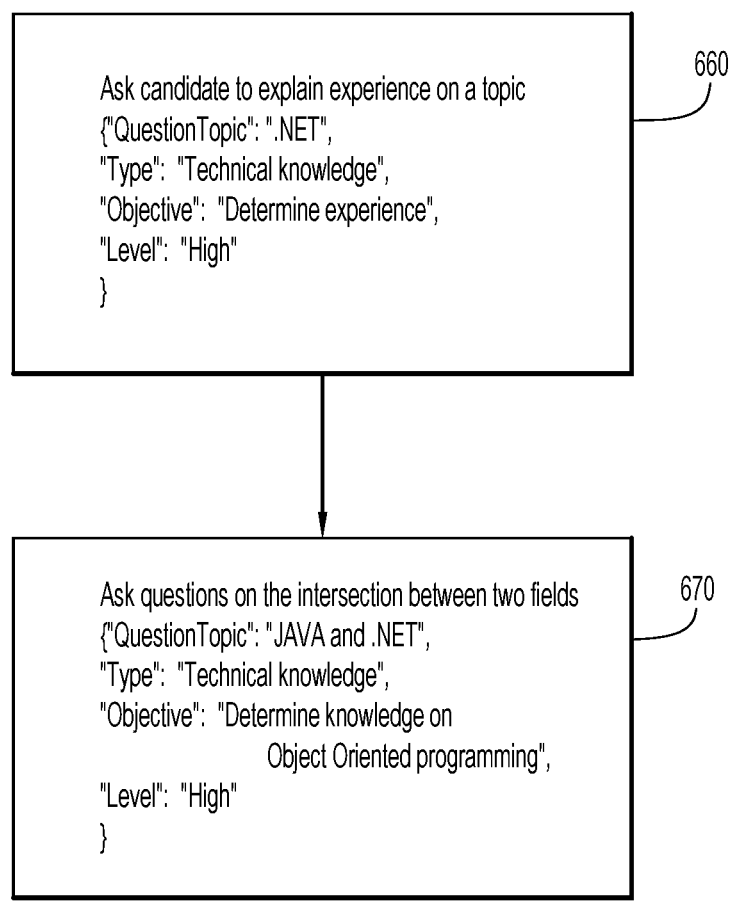

Referring back to FIG. 2, interview structure generator 244 generates the structure of the interview. Examples of interview structures 610, 630, 640, 650, 660, and 670 relating to categories of questions are provided in FIG. 6A-6C, in which each category has an associated "QuestionTopic", "Type", "Objective", and "Level". FIG. 6A additionally shows branching at 620 in regard to a response of a candidate (whether a candidate has experience) to a particular type of question. While interview structure generator 244 does not generate the specific questions that are included in the customized interview questionnaire, the interview structure generator dictates the categories of questions that will be included, including determining which questions are mandatory. By including questions to evaluate required or mandatory competencies, subject matter knowledge related to the competencies may be ascertained.

The interview structure generator 244 maps the candidate competencies to the required competencies to determine which specific questions need to be included. For example, each competency from the application 205 may be mapped with a corresponding competency in the job description 225 to target inclusion of specific categories of questions. Mapping this information leads to the following cases:

Case 1: A competency listed in the job description 225 does not match the candidate's competencies. In this case, the interviewer will want to know if the candidate has any related competency or knowledge that can complement the identified deficiency, or alternatively, if the candidate has knowledge pertaining to the competency but he/she failed to include this information in the job application 205. In response, the interview structure generator 244 will require specific questions to be included in the customized interview questionnaire to address these aspects.

Case 2: The interview structure generator 244 determines that the candidate has competency in a particular area, as a candidate competency 215 is mapped to a required competency 235. In this case, the interview structure generator 244 will designate the inclusion of questions related to this competency as mandatory.

In cases in which a level of experience relating to a specific competency is extracted by the job description parser 230 and/or the job application parser 210, the interview structure generator 244 may designate that questions pertaining to the level of experience are to be included. If a candidate is determined to have a high level of experience, the customized interview questionnaire may include difficult or advanced questions pertaining to the specific competency and level of experience. In some embodiments, the job description parser 230 additionally extracts, in addition to the specific competency, a desired experience level of the candidate with regard to the specific competency. In other embodiments, the job application parser 210 additionally extracts, in addition to the specific competency, an experience level of the candidate with regard to the specific competency.

In order to determine relationships between candidate competencies and required competencies, the competencies analyzer module 242 may be utilized, and the competencies analyzer module 242 will provide the results to the interview structure generator 244.

The competencies analyzer module 242 may provide the most related or the most correlative competencies when a matching competency is not found.

Based on the ontology-based classification (from the competencies analyzer 242), a basic structure of the interview is created. The interview structure generator 244 creates an initial structure defining the type of questions that are to be included into the customized interview questionnaire.

If the candidate has experience in a specific competency not included in the job description, the interview structure generator 244 will include questions directed towards establishing a relationship between these two competencies. By considering competencies of the candidate, not included as part of the job description, the interview structure generator 244 may create questions to ascertain relationships (e.g., such as related competencies or correlative competencies).

Once the interview structure is defined, specific questions may be added to the interview structure by the questions generator 250, e.g., by reusing questions from previous interviews (e.g., from database 40), or by creating new questions by accessing online resources (e.g., deriving or obtaining questions from Wikipedia).

Inputs to the interview structure generator 244 include candidate competencies and required competencies. Outputs include an interview structure with the particular categories of questions to be utilized during the interview, including branching logic.

```
{"QuestionTopic": "Experience on JAVA",
   "Type": "Technical knowledge",
   "Objective" : "Determine competency",
      "Level" : "Medium"
}
```

Questions generator 250 may receive a list of the categories of questions to be included in the customized interview questionnaire 260, from the interview structure generator 244. Questions generator 250 may provide as output, a concrete question for each type of question in the input list of categories of questions.

Reusable Questions Miner 252 mines stored information (e.g., interview questions stored in database 40) for existing questions on a specified competency, and extracts a set of questions tailored to the current applicant based on the output of the interview structure generator. In some embodiments, reusable questions miner 252 uses question topic (e.g., QuestionTopic) information received from question structure (e.g., .NET, JAVA, SQL, etc.) to identify pertinent questions (see, FIG. 6C).

In some aspects, reusable questions miner 252 performs queries based on the question topic, type, objective and level (see, FIG. 6B) and may return N random existing questions fulfilling the criteria, where N is a predefined parameter.

Thus, inputs to reusable questions miner 252 may include a list of categories of questions (e.g., specifying question topic, type, objective and level) from the interview structure generator 244, and the reusable questions miner 252 may generate a set of outputs including a number of concrete questions for each type of question in the input list.

In some cases, database 40 may not contain a number N of existing questions pertaining to a particular question topic. In this case, the interview generator may compute the number of missing questions as the difference between N (the number of needed questions) and F (the number of found questions). The difference (N–F) is passed as a parameter to new questions miner 254 to generate N–F questions for inclusion into the customized interview questionnaire.

The customized interview questionnaire generated by interview module 200 may be provided to a candidate automatically through an online system or may serve as a script for a human interviewer. Thus, a customized interview questionnaire 260 may be generated in view of a candidate's competencies and job description competencies.

Figure 7:
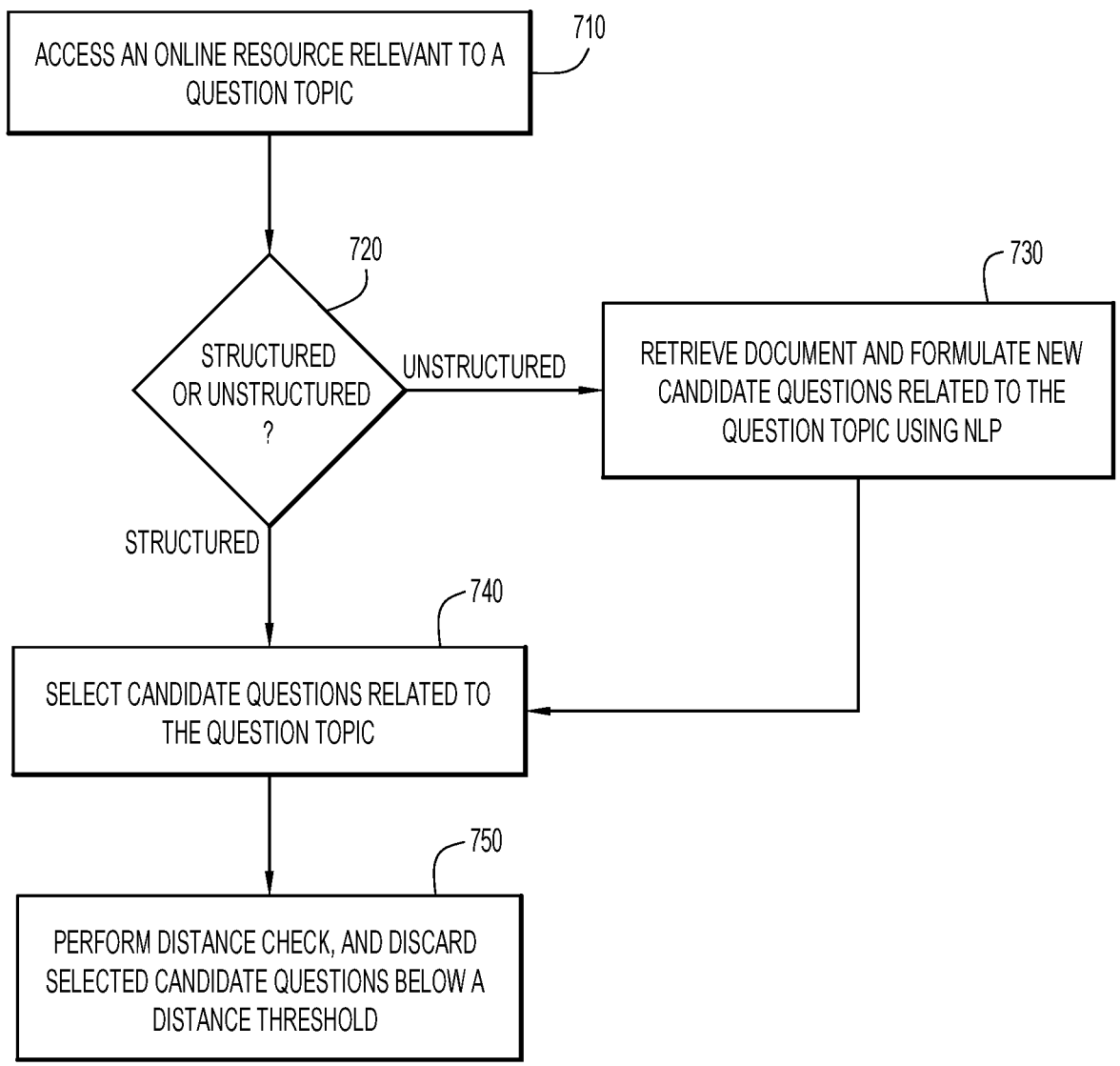
FIG. 7 is a flowchart of operations for generating new interview questions, according to embodiments of the present disclosure.

Referring to FIG. 7, new questions miner 254 generates new questions that are not currently stored in database 40. New questions include questions that were not used in previous interviews, and may be generated according to a question topic, type, objective, and level. For example, a new question may be provided to the interview module 200, wherein the question is selected to assess technical knowledge of JAVA, at a medium competency level.

```
{"QuestionTopic": "Experience on JAVA",
   "Type": "Technical knowledge",
   "Objective" : "Determine competency",
      "Level" : "Medium"
}
```

In embodiments, the new questions may be generated by the following operations. At operation 710, an external set of data relevant to the question topic is accessed. External datasets include, but are not limited to, any online data resource (e.g., Wikipedia, specialized interview resources (e.g., www.geekinterview.com, http://allinterview.com, etc.) as well as text-based or other literature-based resources that are related to the topic and provided to the interview module 200 in electronic form (e.g., books, manuals, etc.). At operation 720, the online resource is classified as an unstructured resource or a structured resource. If classified as an unstructured resource, at operation 730, the unstructured document is retrieved and the material is processed, e.g., using NLP module 18, to extract questions. Sets of questions may be formulated according to the techniques provided herein (e.g., questions may be generated using NLP module 18 that extracts and analyses text to generate questions).

If classified as a structured resource, at operation 740, one or more questions related to the question topic are selected. In some embodiments, a number (N–P) of questions will be selected along with information pertaining to the question including the type, objective, and level of the question (as applicable).

At operation 750, a distance check may be performed to ensure that the selected candidate questions are not too similar to the questions already present within database 40, which comprises a repository of interview questions. Selected candidate questions that have a distance below a threshold are discarded, while selected candidate questions that have a distance above a threshold are retained. A variety of techniques for determining distance (e.g., relatedness of questions) may be used, including but not limited to, Textual Entailment TE methods.

Figure 8:
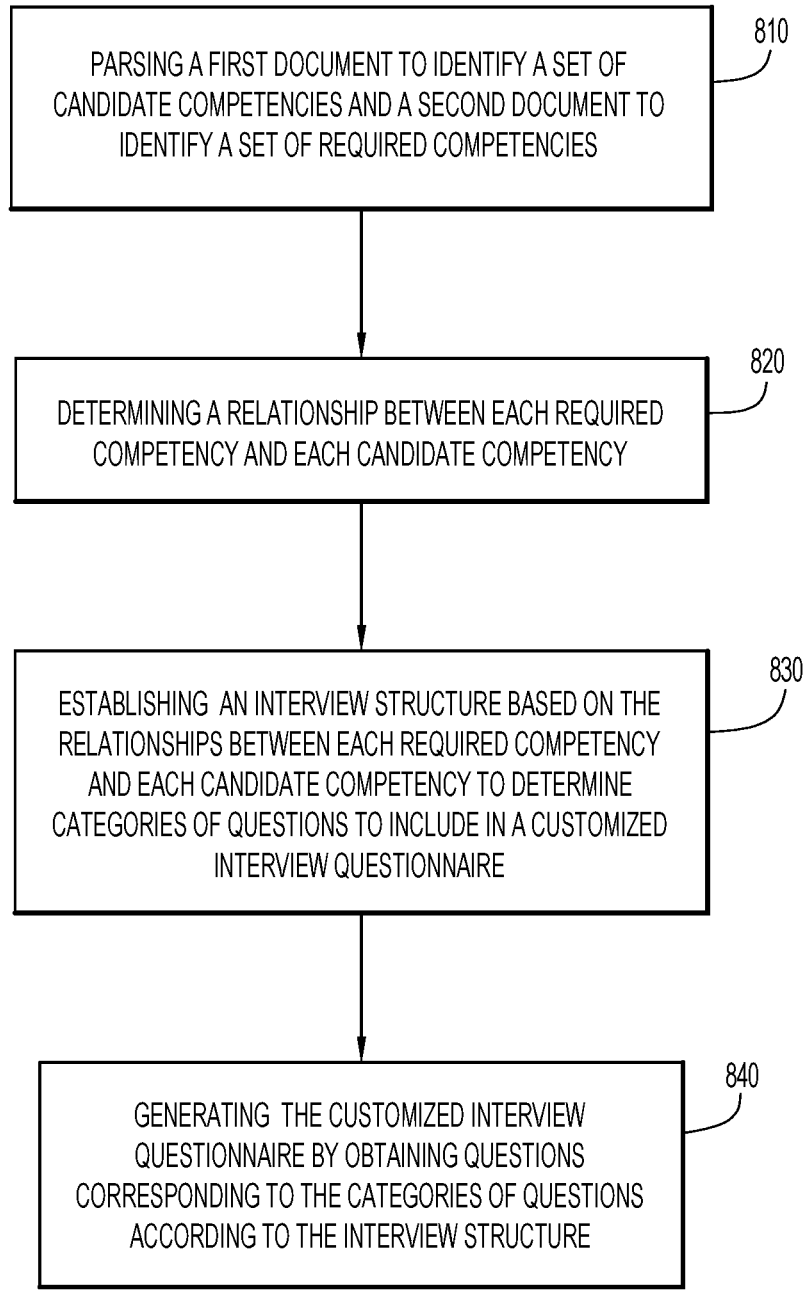
FIG. 8 is a flowchart of operations for generating customized interview questionnaires according to embodiments of the present disclosure.

FIG. 8 shows a flow chart of operations to generate a customized interview questionnaire, according to the embodiments provided herein. At operation 810, a first document is parsed to identify a set of candidate competencies and a second document is parsed to identify a set of required competencies. At operation 820, a relationship is determined between each required competency and each candidate competency. At operation 830, an interview structure is established based on the relationships between each required competency and each candidate competency to determine categories of questions to include in a customized interview questionnaire. At operation 840, the customized interview questionnaire is generated by obtaining questions corresponding to the categories of questions according to the interview structure.

It will be appreciated that the embodiments described above and illustrated in the drawings represent only a few of the many ways of implementing embodiments for generating customized interview questionnaires.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., interview module 200, NLP module 18, administrative interview interface 50, and applicant interview interface 60, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., interview module 200, NLP module 18, administrative interview interface 50, and applicant interview interface 60, etc) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., candidate rankings, customized interview questionnaires, analyzed competencies, etc.). The database system may be implemented by any number of any conventional or other databases, data stores or storage structures (e.g., files, databases, data structures, data or other repositories, etc.) to store information (e.g., candidate rankings, customized interview questionnaires, analyzed competencies, etc.). The database system may be included within or coupled to the server and/or client systems. The database systems and/or storage structures may be remote from or local to the computer or other processing systems, and may store any desired data (e.g., candidate rankings, customized interview questionnaires, analyzed competencies, etc.).

The present invention embodiments may employ any number of any type of user interface (e.g., Graphical User Interface (GUI), command-line, prompt, etc.) for obtaining or providing information (e.g., candidate rankings, customized interview questionnaires, analyzed competencies, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., candidate rankings, customized interview questionnaires, analyzed competencies, etc.).

The present invention embodiments are not limited to the specific tasks or algorithms described above, but may be utilized for any process involving generating questions to address differences between documents.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, in a data analytics system comprising at least one processor and at least one memory, the at least one memory comprising instructions executed by the at least one processor to cause the at least one processor to implement natural language processing and analytics, for automating the generation of customized interview questionnaires, the method performed by the at least one processor and comprising:

analyzing unstructured text of a first document using natural language processing to extract a set of candidate competencies of an entity and deduce corresponding levels of experience for the candidate competencies by categorizing each candidate competency into a corresponding category for a level of experience;

generating a first formatted data structure including the set of candidate competencies and the corresponding levels of experience for the candidate competencies;

analyzing unstructured text of a second document using natural language processing to extract a set of required competencies for an activity and deduce corresponding levels of experience for the required competencies by categorizing each required competency into a corresponding category for a level of experience;

generating a second formatted data structure including the set of required competencies and the corresponding levels of experience for the required competencies;

analyzing the first and second formatted data structures including each candidate competency of the set of candidate competencies and each required competency of the set of required competencies to determine a plurality of relationships between the candidate competencies and the required competencies, wherein the relationships are determined based on an ontology comprising a plurality of classes and predefined levels and include matching competencies, related competencies with a corresponding candidate competency and a corresponding required competency having a same origin class in the ontology, correlative competencies with a corresponding candidate competency and a corresponding required competency each having a parent class along a different branch from a common higher level class in the ontology beyond the parent class and up to a predefined level, and unrelated competencies, and wherein determining the plurality of relationships comprises:

determining one of the plurality of relationships between each candidate competency of the set of candidate competencies and each required competency of the set of required competencies, wherein the plurality of relationships is evaluated in an order of the matching competencies, the related competencies, the correlative competencies, and the unrelated competencies until one of the plurality of relationships is identified between a corresponding candidate competency and a corresponding required competency; and generating a listing indicating the determined one of the plurality of relationships between each candidate competency of the set of candidate competencies and each required competency of the set of required competencies, wherein the determined plurality of relationships between the candidate competencies and the required competencies in the listing includes one or more of the matching competencies, one or more of the related competencies, one or more of the correlative competencies, and one or more of the unrelated competencies;

generating an interview structure based on the listing of relationships between the required competencies and the candidate competencies and the corresponding levels of experience of the candidate and required competencies to determine categories and difficulty of questions to include in a customized interview questionnaire;

generating an interactive online application including the customized interview questionnaire, wherein the customized interview questionnaire includes questions corresponding to the categories and difficulty of questions according to the interview structure, and wherein the interactive online application includes branching logic to branch to a subsequent question of the customized interview questionnaire based on an answer to a current question of the customized interview questionnaire;

generating new interview questions to include in the customized interview questionnaire and discarding at least one new interview question with a distance to the questions included in the customized interview questionnaire below a threshold;

executing the interactive online application to arrange and present the questions of the customized interview questionnaire to the entity according to the branching logic based on answers from the entity to the presented questions;

adjusting the corresponding levels of experience for the candidate competencies using natural language processing based on the answers from the entity to the presented questions; and modifying the interactive online application by changing questions of the customized interview questionnaire based on the adjusted corresponding levels of experience for the candidate competencies.

2. The method of claim 1, wherein at least one of the new interview questions is not in a knowledge base or database and is generated based on an online resource.

3. The method of claim 1, further comprising:
determining that the set of required competencies does not comprise a particular candidate competency of the set of candidate competencies, and generating an interview question to ascertain a relationship of one of the related competencies and the correlative competencies between the particular candidate competency and the set of required competencies.

4. The method of claim 1, further comprising:
determining whether the set of candidate competencies comprises a particular competency, and when the set of candidate competencies does not comprise the particular competency, evaluating the set of candidate competencies to ascertain whether the set of candidate competencies includes a correlative competency or a related competency.

5. The method of claim 1, further comprising generating the new interview questions by analyzing text from unstructured sources or selecting questions from structured resources from online resources.

6. The method of claim 1, further comprising:
ranking a plurality of job applicants for an interview, based upon a number of matches between the candidate competencies of the job applicants and required competencies for a job.

7. A data analytics system for automating the generation of customized interview questionnaires comprising at least one processor configured to execute instructions to cause the at least one processor to:
analyze unstructured text of a first document using natural language processing to extract a set of candidate competencies of an entity and deduce corresponding levels of experience for the candidate competencies by categorizing each candidate competency into a corresponding category for a level of experience;

generate a first formatted data structure including the set of candidate competencies and the corresponding levels of experience for the candidate competencies;

analyze unstructured text of a second document using natural language processing to extract a set of required competencies for an activity and deduce corresponding levels of experience for the required competencies by categorizing each required competency into a corresponding category for a level of experience;

generate a second formatted data structure including the set of required competencies and the corresponding levels of experience for the required competencies;

analyze the first and second formatted data structures including each candidate competency of the set of candidate competencies and each required competency of the set of required competencies to determine a plurality of relationships between the candidate competencies and the required competencies, wherein the relationships are determined based on an ontology comprising a plurality of classes and predefined levels and include matching competencies, related competencies with a corresponding candidate competency and a corresponding required competency having a same origin class in the ontology, correlative competencies with a corresponding candidate competency and a corresponding required competency each having a parent class along a different branch from a common higher level class in the ontology beyond the parent class and up to a predefined level, and unrelated competencies, and wherein determining the plurality of relationships comprises:
determining one of the plurality of relationships between each candidate competency of the set of candidate competencies and each required competency of the set of required competencies, wherein the plurality of relationships is evaluated in an order of the matching competencies, the related competencies, the correlative competencies, and the unrelated competencies until one of the plurality of relationships is identified between a corresponding candidate competency and a corresponding required competency; and generating a listing indicating the determined one of the plurality of relationships between each candidate competency of the set of candidate competencies and each required competency of the set of required competencies, wherein the determined plurality of relationships between the candidate competencies and the required competencies in the listing includes one or more of the matching competencies, one or more of the related competencies, one or more of the correlative competencies, and one or more of the unrelated competencies;

generate an interview structure based on the listing of relationships between the required competencies and the candidate competencies and the corresponding levels of experience of the candidate and required competencies to determine categories and difficulty of questions to include in a customized interview questionnaire;

generate an interactive online application including the customized interview questionnaire, wherein the customized interview questionnaire includes questions corresponding to the categories and difficulty of questions according to the interview structure, and wherein the interactive online application includes branching logic to branch to a subsequent question of the customized interview questionnaire based on an answer to a current question of the customized interview questionnaire;

generate new interview questions to include in the customized interview questionnaire and discard at least one new interview question with a distance to the questions included in the customized interview questionnaire below a threshold;

execute the interactive online application to arrange and present the questions of the customized interview questionnaire to the entity according to the branching logic based on answers from the entity to the presented questions;

adjust the corresponding levels of experience for the candidate competencies using natural language processing based on the answers from the entity to the presented questions; and modify the interactive online application by changing questions of the customized interview questionnaire based on the adjusted corresponding levels of experience for the candidate competencies.

8. The system of claim 7, wherein at least one of the new interview questions is not in a knowledge base or database and is generated based on an online resource.

9. The system of claim 7, wherein the at least one processor is further configured to:

determine that the set of required competencies does not comprise a particular candidate competency of the set of candidate competencies, and generate an interview question to ascertain a relationship of one of the related competencies and the correlative competencies between the particular candidate competency and the set of required competencies.

10. The system of claim 7, wherein the at least one processor is further configured to:

determine whether the set of candidate competencies comprises a particular competency, and when the set of candidate competencies does not comprise the particular competency, evaluate the set of candidate competencies to ascertain whether the set of candidate competencies includes a correlative competency or a related competency.

11. A computer program product for providing visual content for a data analytics system, displayed on an electronic device to a user, the computer program product comprising one or more computer readable storage media collectively having program instructions embodied therewith, the program instructions executable by a processor to:

analyze unstructured text of a first document using natural language processing to extract a set of candidate competencies of an entity and deduce corresponding levels of experience for the candidate competencies by categorizing each candidate competency into a corresponding category for a level of experience;

generate a first formatted data structure including the set of candidate competencies and the corresponding levels of experience for the candidate competencies;

analyze unstructured text of a second document using natural language processing to extract a set of required competencies for an activity and deduce corresponding levels of experience for the required competencies by categorizing each required competency into a corresponding category for a level of experience;

generate a second formatted data structure including the set of required competencies and the corresponding levels of experience for the required competencies;

analyze the first and second formatted data structures including each candidate competency of the set of candidate competencies and each required competency of the set of required competencies to determine a plurality of relationships between the candidate competencies and the required competencies, wherein the relationships are determined based on an ontology comprising a plurality of classes and predefined levels and include matching competencies, related competencies with a corresponding candidate competency and a corresponding required competency having a same origin class in the ontology, correlative competencies with a corresponding candidate competency and a corresponding required competency each having a parent class along a different branch from a common higher level class in the ontology beyond the parent class and up to a predefined level, and unrelated competencies, and wherein determining the plurality of relationships comprises:

determining one of the plurality of relationships between each candidate competency of the set of candidate competencies and each required competency of the set of required competencies, wherein the plurality of relationships is evaluated in an order of the matching competencies, the related competencies, the correlative competencies, and the unrelated competencies until one of the plurality of relationships is identified between a corresponding candidate competency and a corresponding required competency; and generating a listing indicating the determined one of the plurality of relationships between each candidate competency of the set of candidate competencies and each required competency of the set of required competencies, wherein the determined plurality of relationships between the candidate competencies and the required competencies in the listing includes one or more of the matching competencies, one or more of the related competencies, one or more of the correlative competencies, and one or more of the unrelated competencies;

generate an interview structure based on the listing of relationships between the required competencies and the candidate competencies and the corresponding levels of experience of the candidate and required competencies to determine categories and difficulty of questions to include in a customized interview questionnaire;

generate an interactive online application including the customized interview questionnaire, wherein the customized interview questionnaire includes questions corresponding to the categories and difficulty of questions according to the interview structure, and wherein the interactive online application includes branching logic to branch to a subsequent question of the customized interview questionnaire based on an answer to a current question of the customized interview questionnaire;

generate new interview questions to include in the customized interview questionnaire and discard at least one new interview question with a distance to the questions included in the customized interview questionnaire below a threshold;

execute the interactive online application to arrange and present the questions of the customized interview questionnaire to the entity according to the branching logic based on answers from the entity to the presented questions;

adjust the corresponding levels of experience for the candidate competencies using natural language processing based on the answers from the entity to the presented questions; and modify the interactive online application by changing questions of the customized interview questionnaire based on the adjusted corresponding levels of experience for the candidate competencies.

12. The computer program product of claim 11, wherein at least one of the new interview questions is not in a knowledge base or database and is generated based on an online resource.

13. The computer program product of claim 11, wherein the program instructions are executable to:

determine that the set of required competencies does not comprise a particular candidate competency of the set of candidate competencies, and generate an interview question to ascertain a relationship of one of the related competencies and the correlative competencies between the particular candidate competency and the set of required competencies.

14. The computer program product of claim 11, wherein the program instructions are executable to:

determine whether the set of candidate competencies comprises a particular competency, and when the set of candidate competencies does not comprise the particular competency, evaluate the set of candidate competencies to ascertain whether the set of candidate competencies includes a correlative competency or a related competency.

\* \* \* \* \*